Aug. 23, 1966 H. E. MILLER 3,268,280

CUSHIONED BEARING ASSEMBLY

Original Filed Jan. 4, 1962

INVENTOR
*Harvey E. Miller*

BY *McCoy, Greene, Medert*
*+ Te Grotenhuis*
ATTORNEYS

United States Patent Office 3,268,280
Patented August 23, 1966

3,268,280
CUSHIONED BEARING ASSEMBLY
Harvey E. Miller, Logansport, Ind., assignor to The General Tire & Rubber Company, Akron, Ohio, a corporation of Ohio
Original application Jan. 4, 1962, Ser. No. 164,361, now Patent No. 3,188,152, dated June 8, 1965. Divided and this application Apr. 27, 1965, Ser. No. 451,176
8 Claims. (Cl. 308—36.1)

This application is a division of my copending United States patent application, Serial No. 164,361, filed January 4, 1962, now Patent No. 3,188,152.

This invention relates to bearing assemblies suitable for use between relatively rotating or oscillating parts and of the type in which a tubular insert or elastic rubber is confined between a rigid bearing sleeve and a second rigid sleeve coaxial therewith and which provides a cushioned support for the bearing to absorb impacts and vibration and to compensate for misalinement of a shaft or pivot with which it is used.

The present invention provides a bearing assembly suitable for use in various types of pivotal connections between members having relatively oscillating movements or as a support for a rotating member that includes a tubular elastic rubber cushioning element and that is designed to protect the rubber cushioning element against torsional stresses which would tend to cause circumferential slip between the rubber and the sleeves between which it is confined. The rubber insert is preferably held under radial compression between the inner and outer rigid sleeves, the inner sleeve being a bearing sleeve provided with a low friction bearing face formed to retain a lubricant. The low friction material is preferably a resilient plastic material such as nylon, polytetrafluoroethylene such a sold under the trade name "Teflon" or a linear acetal consisting of unbridged polyoxymethylene chains of great length such as sold under the trade name "Delrin."

Reference should be had to the accompanying drawings forming part of this specification, in which.

Figure 1:
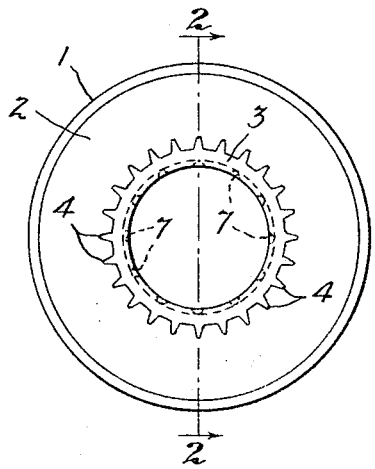
FIGURE 1 is an end elevation of an assembly embodying the invention.
Figure 2:
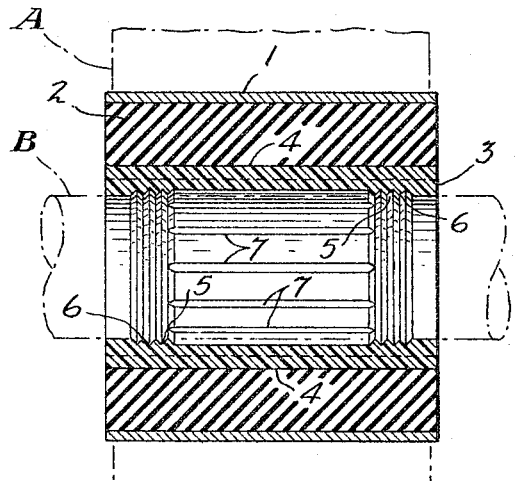
FIGURE 2 is a section taken on the line indicated at 2—2 in FIGURE 1.

FIGURES 1 and 2 of the drawings show a bearing assembly that is interposed between an outer supporting member A and an inner shaft or pivot B. The assembly comprises an outer rigid sleeve 1 which may be formed of metal, a tubular elastic rubber insert 2 that is received within the outer sleeve 1 and which is interposed between the outer sleeve 1 and inner rigid bearing sleeve 3 which is formed of a material which has a low coefficient of friction, preferably a resilient plastic material such as nylon, Teflon or Delrin. The bearing sleeve 3 may be provided with radially projecting external ribs 4 which engage the interior of the rubber insert 2 to provide an interlock and prevent circumferential slippage between the rubber and the bearing sleeve 3. Adjacent each end thereof, the bearing sleeve 3 is provided on its interior face with circumferential grooves 5 which form endless circular circumferential ribs 6 between them and with internal longitudinal grooves 7 which extend throughout the space between the end grooves 5. The longitudinal grooves 7 may be filled with lubricants and the grooves 5 and ribs 6 provide a labyrinth seal at each end of the bearing.

The elastic rubber insert 2 is preferably retained under radial compression between the outer rigid sleeve 1 and the inner bearing sleeve 3. The bearing assembly is designed to be capable of convenient assembly by methods now in common use such as disclosed in the patent to Beck, 2,660,780, granted December 1, 1953. The rubber insert 2 may be contracted and forced into the sleeve 1 by forcing it through a funnel-shaped guide which has its small delivery end registered with one end of the sleeve 1. After assembly of the insert with the sleeve 1, the inner bearing sleeve can be forced into the rubber insert 2 behind a suitable tapered pilot or other expanding means which expands the opening of the tubular insert 2 to a diameter to receive the bearing sleeve.

Figure 3:
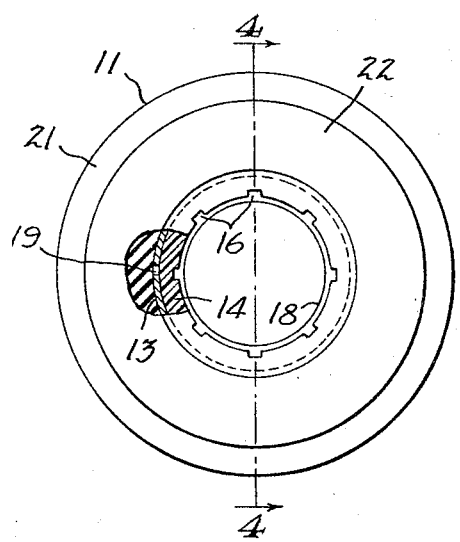
FIGURE 3 is an end elevation showing a modification of the assembly with a portion broken away and shown in section.
Figure 4:
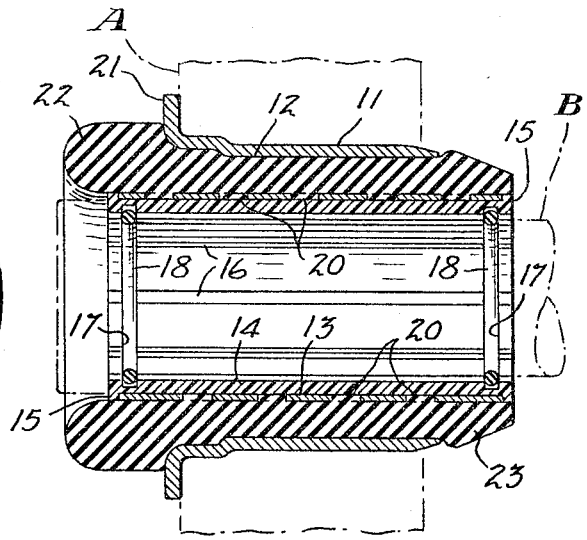
FIGURE 4 is a section taken on the line indicated at 4—4 in FIGURE 3.

In FIGURES 3 and 4 of the drawings, a modification is shown in which an outer rigid sleeve 11 which is circumferentially continuous confines an elastic tubular insert 12 which is retained under radial compression between the sleeve 11 and an inner two-part bearing sleeve composed of an outer cylindrical member 13 which is interposed between an inner cylindrical part 14 and the rubber insert 12.

The inner cylindrical part 14 of the bearing sleeve is circumferentially continuous and composed of a material having a low coefficient of friction. The part 14 is provided with radially outwardly projecting end portions 15 which are of a height corresponding to the thickness of the outer cylindrical member 13 and which receive the cylindrical member 13 between them. The interior bearing face of the inner bearing part 14 is provided with longitudinal lubricant receiving grooves 16 and with a circumferential groove 17 adjacent each end which receives a rubber O-ring 18 to provide a seal at each end of the bearing to prevent escape of lubricant. The outer sleeve 11 and the outer part 13 of the inner bearing sleeve are preferably formed of metal and the inner part 14 of the bearing sleeve is preferably formed of a resilient plastic having a low coefficient of friction such as above described. In order to permit assembly of the relatively rotatable bearing sleeve parts 13 and 14, the outer member 13 may be provided with a longitudinal split 19 which enables it to be expanded sufficiently to permit the cylindrical member 13 to be slipped endwise over the projecting portions 15 at one end of the inner bearing part 14 and contracted into snug engagement with the exterior of the part 14 between the end flanges 15 thereof. The parts 13 and 14 are assembled prior to the assembly of the bearing sleeve within the rubber insert 12. The outer member 13 of the bearing sleeve may be provided with perforations 20 into which portions of the elastic rubber insert 12 are expanded to provide an interlock and prevent longitudinal or circumferential slippage between the insert 12 and the member 13 of the bearing sleeve which contacts it. The outer sleeve 11 may be provided with an ordinary projecting flange 21 at one end for engagement with a supporting member A to properly position the bearing assembly with respect to the supporting member A. The rubber insert 12 and the inner bearing sleeve are both longer than the outer sleeve 11 so that end portions 22 and 23 of the rubber insert 12 are expanded into engagement with the ends of the sleeve 11 to hold the same against longitudinal movement with respect to the rubber insert.

It is to be understood that in accordance with the provisions of the patent statutes, variations and modifications of the specific devices herein shown and described may be made without departing from the spirit of the invention.

What I claim is:
1. A cushioned bearing assembly comprising an inner sleeve, a concentric outer rigid sleeve and a tubular insert of elastic rubber retained under radial compression between said sleeves, said inner sleeve having an interior cylindrical bearing portion composed of a low friction material and adapted to bear against a shaft pivotally re- ceived in said inner sleeve, said interior portion being provided with a series of circumferentially spaced longitudinally extending lubricant receiving grooves, sealing means intermediate the ends of said interior portion comprising circumferential groove means adjacent said ends for retarding escape of lubricant from said assembly, and a slip preventing interlock between the exterior of said inner sleeve and said tubular elastic insert comprising a series of integral radially projecting longitudinal reinforcing ribs closely spaced around the circumference of said inner sleeve.

2. A cushioned bearing assembly comprising an inner sleeve, a concentric outer rigid sleeve and a tubular insert of elastic rubber retained under radial compression between said sleeves, said inner sleeve comprising a continuous inner cylindrical bearing part composed of a low friction material and adapted to bear against a shaft, said inner bearing part being provided with a series of longitudinally extending lubricant-receiving grooves, sealing means intermediate the ends of said bearing part comprising circumferential groove means adjacent said ends for retarding the escape of lubricant from said assembly, and an outer cylindrical member interposed between said tubular insert and said inner part, said outer member being provided with perforations into which portions of said tubular insert may expand to provide a slip-preventing interlock.

3. A cushioned bearing assembly comprising an inner sleeve, an outer rigid sleeve coaxial therewith and a tubular insert of elastic rubber retained under substantial radial compression between said sleeves, said inner sleeve being composed of a resilient low-friction material and being adapted to surround and bear against the circumference of a shaft pivotally received in said inner sleeve, the interior face of said inner sleeve being provided with longitudinal lubricant-receiving grooves, and sealing means spaced inwardly from the opposite ends of said inner sleeve comprising circumferential groove means adjacent said ends for retarding escape of lubricant from said assembly.

4. A cushioned bearing assembly as defined in claim 3 wherein said sealing means comprises a series of circumferential ridges and grooves formed in said interior face of said inner sleeve adjacent each end thereof to provide a labyrinth seal at each end of the inner sleeve.

5. A cushioned bearing assembly as defined in claim 3 wherein a slip-preventing interlock is provided between the exterior of said inner sleeve and said tubular elastic insert, said interlock comprising a series of radially projecting external ribs integral with said inner sleeve, said ribs extending longitudinally between the ends of said inner sleeve to resist deformation of the inner sleeve by the compressed rubber insert.

6. A cushioned bearing assembly as defined in claim 3 wherein said inner sleeve comprises an inner cylindrical bearing part which is surrounded by a split outer cylindrical member which is interposed between said inner bearing part and said tubular rubber insert, said outer cylindrical member being provided with perforations into which portions of said tubular insert expand to provide slip-preventing interlock.

7. A cushioned bearing assembly as defined in claim 4 wherein said inner sleeve is composed of a resilient plastic having a low coefficient of friction, said plastic being formed to provide labyrinth seals of serrate cross section and to provide closely spaced radially projecting external ribs, said ribs extending longitudinally between the ends of said inner sleeve to reinforce said sleeve.

8. A cushioned bearing assembly as defined in claim 6 wherein said inner cylindrical bearing part has radially projecting flanges engageable with the ends of said outer cylindrical member to prevent axial movement thereof, and wherein said sealing means comprises rubber O-rings seated in internal circumferential grooves formed in the interior face of said inner cylindrical bearing part adjacent the ends thereof.

References Cited by the Examiner

UNITED STATES PATENTS

| 1,980,117 | 11/1934 | Turner | 308—72 X |
| 2,127,200 | 8/1938 | Boersma | 308—238 |
| 2,923,579 | 2/1960 | Scheel | 308—238 X |

FOREIGN PATENTS

| 1,145,882 | 10/1957 | France. |
| 653,982 | 5/1951 | Great Britain. |
| 783,221 | 9/1957 | Great Britain. |
| 847,171 | 9/1960 | Great Britain. |

DAVID J. WILLIAMOWSKY, *Primary Examiner.*

DON A. WAITE, *Examiner.*

L. L. JOHNSON, *Assistant Examiner.*